(12) United States Patent
Govender

(10) Patent No.: US 7,857,697 B2
(45) Date of Patent: Dec. 28, 2010

(54) SYSTEM AND METHOD FOR JACKPOT WAGERING

(75) Inventor: Devan Govender, Durban (ZA)

(73) Assignee: Waterleaf Limited, Isle of Man ( * ) Notice: Subject to any disclaimer, the term of this patent is extended or adjusted under 35 U.S.C. 154(b) by 1251 days.

(21) Appl. No.: 10/532,850

(22) PCT Filed: Oct. 27, 2003

(86) PCT No.: PCT/IB03/04736

§ 371 (c)(1),
(2), (4) Date: Dec. 19, 2005

(87) PCT Pub. No.: WO2004/037363

PCT Pub. Date: May 6, 2004

(65) Prior Publication Data
US 2006/0149561 A1    Jul. 6, 2006

(30) Foreign Application Priority Data
Oct. 28, 2002   (GB)   ................................ 0224989.4

(51) Int. Cl.
*A63F 9/24* (2006.01)
*A63F 13/00* (2006.01)

(52) U.S. Cl. .............................. 463/25; 463/20; 463/26; 463/27; 463/28; 463/42

(58) Field of Classification Search .................... 463/16, 463/17, 25, 26, 27, 20, 42
See application file for complete search history.

(56) References Cited

U.S. PATENT DOCUMENTS 5,275,400 A * 1/1994 Weingardt et al. ............ 463/12
5,816,918 A * 10/1998 Kelly et al. ................... 463/16
5,839,960 A * 11/1998 Parra et al. .................... 463/41
5,851,147 A * 12/1998 Stupak et al. ................. 463/13
5,988,638 A * 11/1999 Rodesch et al. .......... 273/143 R (Continued)

FOREIGN PATENT DOCUMENTS

WO         2003/04736         4/2005

OTHER PUBLICATIONS

Supplementary Partial European Search Report, dated Nov. 20, 2007, for related application EP 03 75 8420.

*Primary Examiner*—John M Hotaling, II
*Assistant Examiner*—Ryan Hsu
(74) *Attorney, Agent, or Firm*—McDonnell Boehnen Hulbert & Berghoff LLP (57) ABSTRACT

A jackpot wagering system (1) includes a player terminal (3) operable by a player to place a wager on a number of games of chance a random event generator (8) that generates random events upon which outcomes of the games of chance are based, and a determination facility that determines the quantum of a prize that is available to be won by a player upon the occurrence of a favorable outcome of the game of chance. The quantum of the prize is determined as a function of the size of the player's wager and the maximum limit of the wager. The player's wager is subject to a maximum limit and a portion of each wager is accumulated in an accumulation account as a jackpot prize. The contents of the accumulation account are denominated in a base currency that is selected to be a strongest one of the playing currencies.

28 Claims, 3 Drawing Sheets

U.S. PATENT DOCUMENTS

| | | | |
|---|---|---|---|
| 6,024,641 A * | 2/2000 | Sarno | 463/17 |
| 6,059,659 A | 5/2000 | Busch et al. | |
| 6,217,448 B1 * | 4/2001 | Olsen | 463/25 |
| 6,592,460 B2 * | 7/2003 | Torango | 463/27 |
| 6,712,695 B2 * | 3/2004 | Mothwurf et al. | 463/25 |
| 6,869,361 B2 * | 3/2005 | Sharpless et al. | 463/25 |
| 7,297,059 B2 * | 11/2007 | Vancura et al. | 463/27 |
| 2001/0036857 A1 * | 11/2001 | Mothwurf et al. | 463/25 |
| 2002/0042297 A1 * | 4/2002 | Torango | 463/27 |
| 2002/0068632 A1 | 6/2002 | Dunlap | |
| 2005/0026669 A1 * | 2/2005 | Nelson et al. | 463/16 |

* cited by examiner

SYSTEM AND METHOD FOR JACKPOT WAGERING

FIELD OF THE INVENTION

This invention relates to a system for jackpot wagering and, more particularly, but not exclusively, to a system for jackpot wagering in relation to casino games. The invention extends to a method for jackpot wagering in relation to casino games.

BACKGROUND OF THE INVENTION

Jackpot wagering systems are well known in land-based casinos. The most common such wagering system is found in a simple three-reel slot machine. Each reel of the slot machine has, say, 30 indexed positions, some or all of which may display a corresponding indicium. A player of the slot machine is required to place a wager by introducing coins, tokens or credit into the slot machine, which then enables each of the three reels to be spun and to come to rest ay any of the indexed positions. One resulting combination of indexed rest positions usually allows the player to win a prize consisting of a fixed jackpot. A slot machine with this particular geometry provides the player with a 1 in 27 000 chance of winning the fixed jackpot.

In order to take advantage of the random nature of the indexed rest positions of the reels, it is known to replace the fixed jackpot by a progressive jackpot in which a proportion of each wager placed by the player of the slot machine is used to increment the jackpot. The randomness makes it possible for the progressive jackpot to become large relative to the fixed jackpot described above, which enhances the attractiveness of the slot machine to would-be players thereof. It must, of course, be appreciated that the randomness also raises the possibility of the progressive jackpot being won when it is small relative to the above fixed jackpot.

The probability of winning the jackpot is the reciprocal of the number of all possible outcomes of the game that will, for convenience, be referred to as the jackpot cycle of the game. As an illustration, the jackpot cycle of the three-reel slot machine described earlier in this specification is 27 000. This means that, on average, 27 000 outcomes of the game must be determined in order for the contents of the progressive jackpot, to be won by the player.

The next step in the evolution of jackpot wagering systems was to link multiple slot machines having identical jackpot cycles to the same progressive jackpot, leading to the creation of larger and more attractive jackpots. Initially, the multiple identical slot machines linked to such progressive jackpots were clustered in close proximity to each other, such as within the confines of a land-based casino, but the advent of low-cost telecommunication networks soon enabled multiple remote clusters of identical slot machines to be linked to a single progressive jackpot. It is a characteristic of such distributed progressive jackpot wagering systems that they are restricted to casinos belonging to a single business enterprise.

The advent of open communication networks such as the Internet has led to a proliferation of online casinos, bringing online gaming within the reach of anyone with access to the World Wide Web of the Internet. Jackpot wagering systems and progressive jackpot wagering systems have now become available through such online casinos, Online progressive jackpot wagering systems have evolved further to a point where it is now known for players at competing online casinos to be able to play identical casino games linked to a common progressive jackpot, Access to these types of progressive jackpot wagering systems is provided through Jackpot portals on the World Wide Web.

OBJECT OF THE INVENTION

It is an object of this invention to provide a jackpot wagering system, and a method for jackpot wagering that exhibits increased functionality relative to prior art equivalents.

SUMMARY OF THE INVENTION

In accordance with this invention there is provided a jackpot wagering system, comprising:

a player terminal operable by a player to place a wager on a turn of at least one game of chance, the wager having a maximum limit;

an accumulation facility responsive to placement of the wager to accumulate a portion thereof in an accumulation account;

a random event generator activatable to generate a random event upon which an outcome of the at least one game of chance is based, the outcome including a favourable outcome causing the player to win a determinable portion of the contents of the accumulation account; and a determination facility responsive to placement of the wager to determine, prior to activation of the random event generator, the determinable portion of the contents of the accumulation account as a function of at least the size of the wager and the maximum limit thereof.

Further features of the invention provide for the player terminal to be operable to place a wager on a turn of any one of a plurality of different selectable games of chance, each one of the plurality of different games of chance having a corresponding maximum limit for a wager and a respective favourable outcome causing the player to win a determinable portion of the contents of the accumulation account, for the wager to be denominatable in any one of a number different permissible playing currencies, for contents of the accumulation account to be denominatable in a base currency which is stronger than or equal to a strongest one of the permissible playing currencies, for the strongest one of the permissible playing currencies to be the base currency, for the maximum limit of the wager to be denominated in the base currency, for the jackpot wagering system to include a conversion facility instructable to convert a wager from any one of the different permissible playing currencies to an equivalent wager in the base currency, and for the conversion facility to include a stored spot exchange rate from any one of the permissible playing currencies to the base currency, the stored spot exchange rates being selectively updateable from time to time.

Still further features of the invention provide for the wager to be denominatable as an integral number of units or an integral number of fractional units of any one of the permissible playing currencies.

Yet further features of, the invention provide for the function by which the determination facility determines the portion of the contents of the accumulation account to be won by the player to be a ratio of the size of the wager to the maximum limit thereof, for the determination facility to determine the size of the wager as a function of the particular permissible playing currency in which the wager is denominated and a corresponding denomination of the of units or fractional units of that playing currency, and for the determination facility to determine the maximum limit of the wager as a function of the base currency.

There is also provided for each one of the plurality of different games of chance to have a corresponding jackpot cycle, for the determination facility to determine the determinable portion of the contents of the accumulation account as a function of at least the size of the wager, a maximum limit thereof, and the jackpot cycle of the selected game of chance, for the function by which the determination facility determines the portion of the contents of the accumulation account to be won by the player to be a product of a ratio of the size of the wager to the maximum limit thereof, and a relative size of the jackpot cycle of the selected game of chance, and for the relative size of the jackpot cycle of the selected game to be a ratio of the jackpot cycle of the selected game to the greatest jackpot cycle of any one of the plurality of different selectable games.

There is further provided for the outcome of the at least one game of chance to include a plurality of different partially favourable outcomes, each partially favourable outcome causing the portion of the contents of the accumulation account won by the player to be to be proportionally reduced, for the reduction in response to the occurrence of a partially favourable outcome of the game of chance to be proportional to the probability of occurrence of the corresponding outcome, for there to be preferably three partially favourable outcomes, alternatively five partially favourable outcomes, and for the portion of the wager accumulated in the accumulation account by the accumulation facility to be a percentage of the wager, preferably three percent.

The invention extends to a method for jackpot wagering, comprising the steps of: placing a wager on a turn of at least one game of chance, the wager having a maximum limit;

accumulating a portion of the wager in an accumulation account;

generating a random event upon which an outcome of the at least one game of chance is based, the outcome including a favourable outcome causing the player to win a determinable portion of the contents of the accumulation account; and determining, prior to generating the random event, the determinable portion of the contents of the accumulation account as a function of at least the size of the wager and the maximum limit thereof.

The method includes the further step of placing a wager on a turn of any one of a plurality of different selectable games of chance, each one of the plurality of different games of chance having a corresponding maximum limit for the wager and a respective favourable outcome causing the player to win a determinable portion of the contents of the accumulation account, for denominating the wager in any one of a number different permissible playing currencies, for denominating the contents of the accumulation account in a base currency which is stronger than or equal to a strongest one of the permissible playing currencies, for selecting the strongest one of the permissible playing currencies to be the base currency, for denominating the maximum limit of the wager in the base currency, for converting a wager from any one of the different permissible playing currencies to an equivalent wager in the base currency, for providing a stored spot exchange rate from any one of the permissible playing currencies to the base currency, the stored spot exchange rates being updated from time to time.

There is still further provided for denominating the wager as an integral number of units or as an integral number of fractional units of any one of the permissible playing currencies.

There is yet further provided for determining the portion of the contents of the accumulation account to be won by the player as a ratio of the size of the wager to the maximum limit thereof, for determining the size of the wager as a function of the particular permissible playing currency in which the wager is denominated and a corresponding denomination of the of units or fractional units of that playing currency, and for determining the maximum limit of the wager as a function of the base currency.

There is also provided for further determining a jackpot cycle of each one of the plurality of different games of chance, for determining the determinable portion of the contents of the accumulation account as a function of at least the size of the wager, a maximum limit thereof, and a jackpot cycle of the selected game of chance, for determining the portion of the contents of the accumulation account to be won by the player as a product of a ratio of the size of the wager to the maximum limit thereof, and a relative size of the jackpot cycle of the selected game of chance, and for determining the relative size of the jackpot cycle of the selected game as a ratio of the jackpot cycle of the selected game to the greatest jackpot cycle of any one of the plurality of different selectable games.

There is also provided for establishing a plurality of different partially favourable outcomes for the at least one game of chance, preferably three partially favourable outcomes, alternatively five partially favourable outcomes, each partially favourable outcome causing the portion of the contents of the accumulation account won by the player in response to each partially favourable outcome to be proportionally reduced, for reducing the portion of the contents of the accumulation account won by the player in response to the occurrence of a partially favourable outcome of the game of chance in proportion to the probability of occurrence of the corresponding outcome, and for accumulating the portion of the wager in the accumulation account as a percentage of the wager.

BRIEF DESCRIPTION OF THE DRAWINGS

One embodiment of the invention is described below, by way of example only, and with reference to the abovementioned drawings, in which.

DETAILED DESCRIPTION OF THE INVENTION

Figure 1:
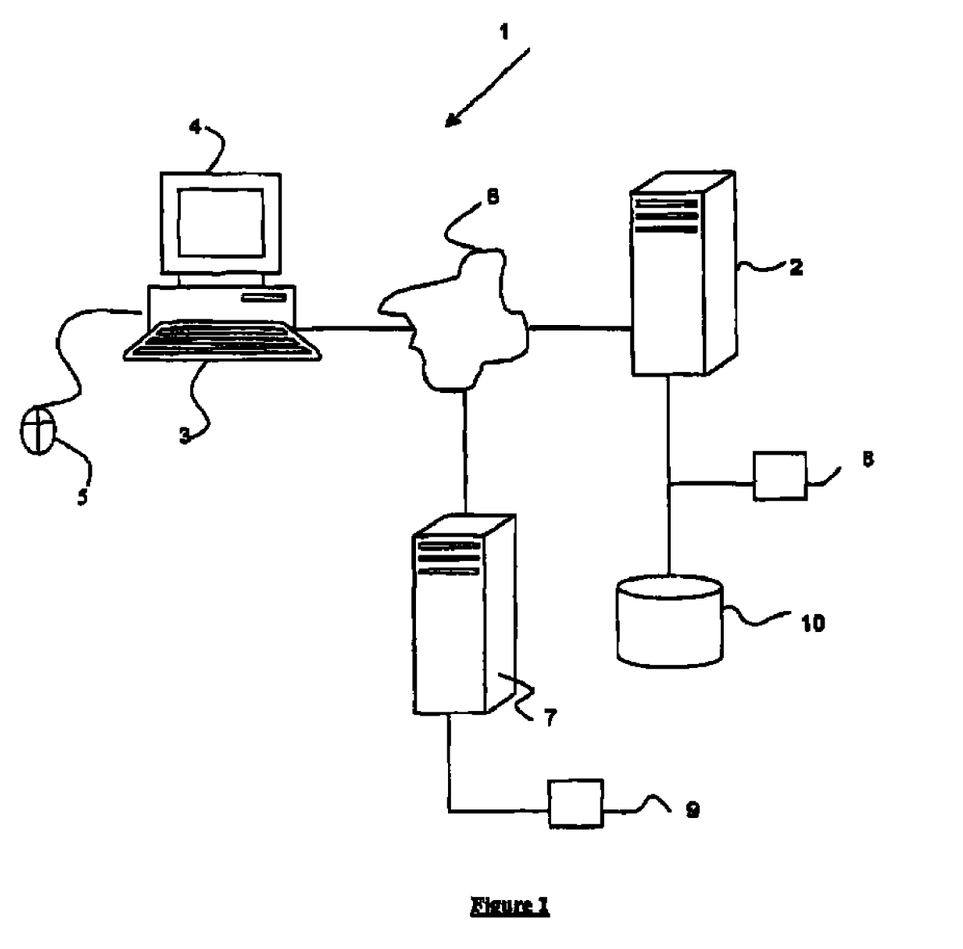
FIG. 1 is schematic representation of a jackpot wagering system according to the invention.
Figure 2:
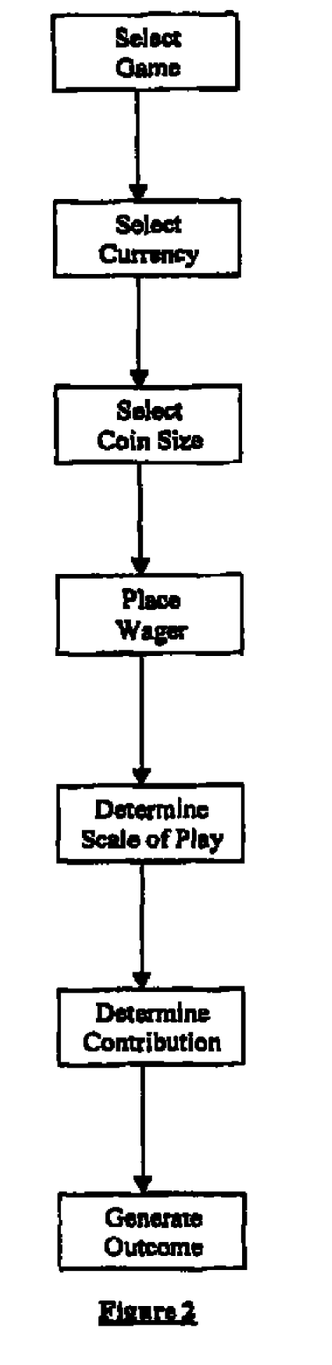
FIG. 2 is a simplified flow chart of the operation of the jackpot wagering system of FIG. 1.

Referring to FIG. 1, a jackpot wagering system is indicated generally by reference numeral (1).

The jackpot wagering system (1) includes a gaming server (2) and a player terminal (3) in the form of a computer workstation with an associated display monitor (4) and a pointing device (5), such as a mouse or a touchpad. The computer workstation (3) is located remotely from the gaming server (2) and communication between the computer workstation and the gaming server is provided across a communication network (6) that is, in this embodiment, the Internet. The system (1) also includes an accumulation facility (7) in the form of an application server that is also connected to the communication network (6).

The computer workstation (3) is a conventional personal computer operating under a Windows 2000 operating system, which is well known and commercially available from the Microsoft Corporation of Seattle, Wash., USA. The computer workstation (3) executes one or more simulation software programs, each of which simulates the progress of a different game of chance. The generic operation of the simulation programs will be described in more detail in the description that follows.

The gaming server (2) includes a random event generator in the form of a computer program (8) that is executable to generate random events upon which an outcome of any one of the games of chance is based, As an illustration, one of the simulation programs on the computer workstation (3) simulates a game of roulette and, in this instance, the random event generation program (8) is executable to select, on a random basis, an integer between 0 and 36 that is displayed on the computer workstation as a ball coming to rest at a corresponding one of 37 demarcated positions on a roulette wheel. As a further illustration, another one of the simulation programs simulates a game of draw poker and the random event generation program (8) is executable to generate five random integers between 1 and 52 that correspond to five playing cards making up a particular hand of poker.

The application server (7) also operates under the Windows 2000 operating system and executes an accumulation software program (9) that communicates with the gaming server (2).

A player wishing to use the jackpot wagering system (1) is first required to register and to create an account on the gaming server (2). The player is then required to pre-fund the account by purchasing credit that will, for convenience, be denominated in this description in "units". The gaming server (2) stores a credit balance corresponding to the players account at all times.

In order to commence, the player uses the computer workstation (3) to log onto the gaming server (2) and initiates execution of any selected one of the simulation software programs, which displays an appropriate image of a corresponding game of chance on the monitor (4). The player now enters a betting phase of the game of chance by making a wager on the game. The player may make any wager that is permitted for the particular selected game. The player's wager is denominated as an integral number of units of credit. The size of the player's wager is displayed on the display monitor (4). There must be sufficient credit in the player's account to cover any wager that is made by the player. Data relating to the type and size of the wager made by the player is transmitted by the computer workstation (3) across the communication network (6) to the gaming server (2) where it is recorded in a database on an associated storage device (10), such as a magnetic or optical storage disk.

The gaming server (2) forwards data relating to the size of each wager across the communication network (6) to the application server (7) where it is processed by the accumulation software program (9). The accumulation software program (9) maintains a balance of an accumulation account on the application server (7) and increments this a balance by an amount equal to a predetermined portion of each wager made by the player. The predetermined portion of each wager that is accumulated in this manner is 3 percent of the wager.

It is envisaged that a plurality of different players may each simultaneously use the Jackpot wagering system (1), each from a corresponding different computer workstation (3). Each player may individually select which of the available games of chance they wish to play. The accumulation software program (9) increments the balance of the accumulation account by an amount corresponding to a predetermined portion of each wager made by each one of the plurality of different players using the jackpot wagering system (1). It Will be appreciated by those skilled in the art that the balance of the accumulation account can rapidly become large, which renders the jackpot wagering system (1) attractive to participating and would-be players.

Each one of the selectable games of chance has a single favourable outcome, three partially favourable outcomes, and a plurality of unfavourable outcomes. When the random event generator (8) generates random events that result in an unfavourable outcome, the player's wager is forfeited to an operator of the jackpot wagering system. When a favourable outcome of the game of chance occurs, the player wins the entire contents of the accumulation account. When a partially favourable outcome occurs, the player wins a predetermined fraction of the contents of the accumulation account. The game of chance also has a number of intermediate outcomes, each of which causes the player to win the wager at predetermined fixed odds. The payout characteristics of the game of chance are arranged such that the predetermined fraction of the contents of the accumulation account that is won by the player in response to the occurrence of any one of the partially favourable outcomes of the game of chance is inversely proportional to the probability of that outcome.

In a first variation of this embodiment of the invention, a player is able to make a wager that is denominated as an integral number of fractional units of credit. This is analogous, in a physical environment, to making wagers denominated in different coin sizes.

In a further variation of this embodiment of the invention, a player may purchase credit and make a wager in any one of a number of different permissible playing currencies. The jackpot wagering system (1) also has a base currency that is used to denominate the balance of the accumulation account. For convenience, the base rate has an exchange rate less than or equal to unity with each one the permissible playing currencies. This means that it is either stronger than all of the permissible playing currencies or, when the base currency is one of the permissible playing currencies, it is the strongest of the permissible playing currencies.

Figure 3:
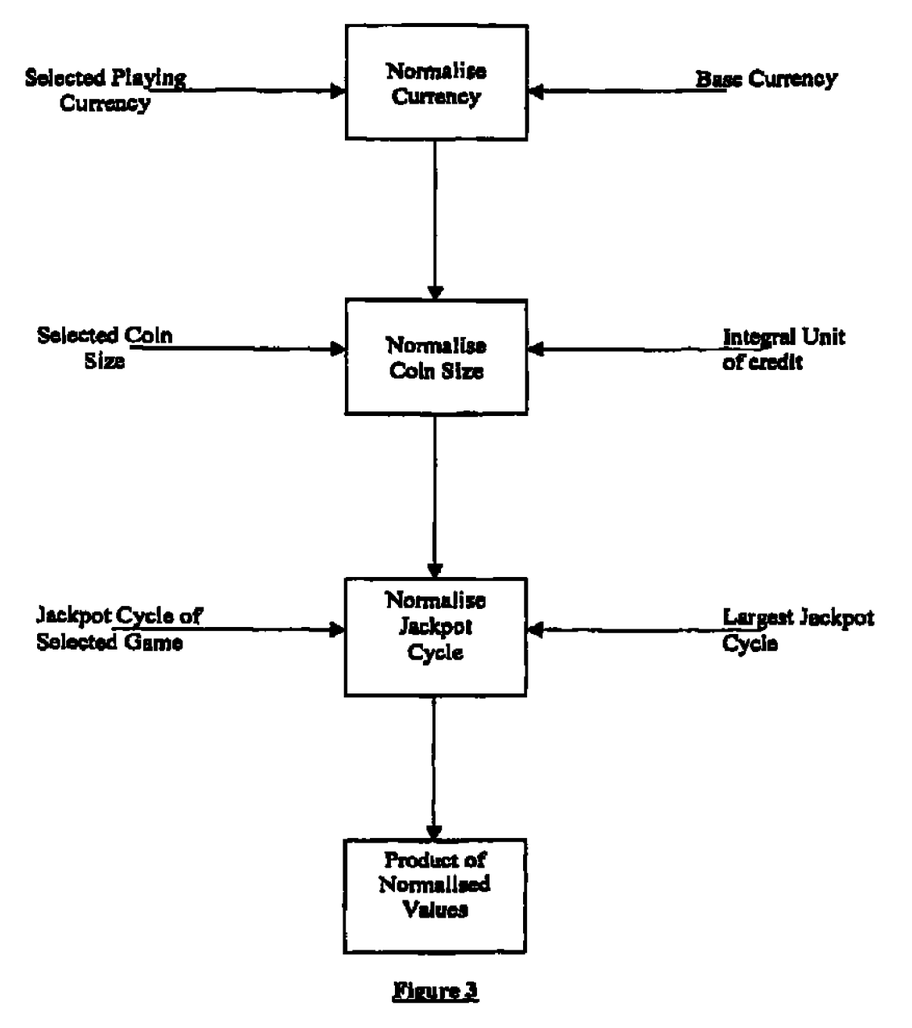
FIG. 3 is a flow chart of a computation of a scale of play for the jackpot wagering system of FIG. 1.

In order to further illustrate the operation of the jackpot wagering system (1), a number of illustrative examples are outlined below. It is, however, first necessary to introduce a parameter termed "scale of play". The scale of play is defined as being a percentage of the jackpot that will be won by the player on the next turn of the selected game of chance if the outcome of the turn is a favourable outcome. It will be appreciated that the scale of play will always lie between zero and one. The scale of play for a particular turn of the game is a function of the following playing parameters: the size of the wager made by the player, which is, in turn, determined by the "coin size" and the permissible playing currency used by the player in making the wager, and the jackpot cycle of the particular game selected by the player. In order to determine a scale of play that accommodates a choice of playing currency, a choice of "coin size" and a choice of game from a menu of games having differing jackpot cycles, each one of these playing parameters is normalised, respectively, against a corresponding maximum value of these playing parameters that are, respectively, base currency, a "coin size" that is an integral unit of credit, and the largest jackpot cycle of any one of the plurality of games of chance selectable by the player.

The calculation of scale of play for any particular turn of the selected game of chance is determined as a product of the above three normalised playing parameters, expressed as a percentage, namely:

Scale (%)=Currency (%)*Coin size (%)*Jackpot Cycle (%)

The computed scale parameter determines the portion of the jackpot that can be won by the player on the turn of the game upon the occurrence of a favourable outcome. The scale parameter is displayed to the player by means of an icon on the display monitor (4).

It will be further appreciated by those skilled in the art that the predetermined portion of the wager accumulated by the application server (7) is determined by the first two of the above parameters, choice of permissible playing currency and the "coin size" used by the player to make the wager.

EXAMPLE 1

Multi-Currency

The base currency of the jackpot wagering system (1) is United States Dollars ($), the accumulated total of the Jackpot is $20 000,00 with a wager requirement of 3×$1 coins to with the jackpot of the particular game.

A $ player wagering 3×$1 coins will be playing at a scale of 100% and can win the entire contents of the jackpot upon the occurrence of a favourable event.

The scale of play for an Australian Dollar (AUD) player wagering 3×1 AUD coins at an exchange rate of $1=2×AUD will be;

$$\text{Scale} = \text{Currency}(\%) * \text{Coin size}(\%) * \text{Jackpot Cycle}(\%)$$
$$= AUD(\%) * 100\% * 100\%$$
$$= 50\% * 100\% * 100\%$$
$$= 50\%$$

In this instance, the player will see a scale parameter of 50% displayed on the display monitor (4) and will win 50% of the jackpot, namely $10 000,00, which is equivalent to AUD 20 000,00, upon the occurrence of a favourable event.

If the contribution percentage for the selected game is 3%, the player's contribution to the jackpot is 3% of his wager, namely 3 %*AUD 3=AUD 0.09 =$0.045.

EXAMPLE 2

Multiple Coinsize

The base currency of the jackpot wagering system (1) is USD, the accumulated total of the jackpot is $20 000,00 with a wager requirement of 3×$1 coins to win the jackpot of the particular game.

A $ player wagering 3×$1 coins will be playing at a scale of 100% and can win the entire contents of the jackpot upon the occurrence of a favourable event.

The scale of play for a $ player, wagering 3×$0.25 coins will be:

$$\text{Scale} = \text{Currency}(\%) * \text{Coin size}(\%) * \text{Jackpot Cycle}(\%)$$
$$= 100\% * 25\% * 100\%$$
$$= 25\%$$

In this instance, the player will see a scale parameter of 25% displayed on the display monitor (4) and will win 25% of the Jackpot, namely $5 000,00, upon the occurrence of a favourable event.

If the contribution percentage for the selected game is 3%, the player's contribution to the jackpot is 3% of his wager, namely 3%* $0.75=$0.0225.

EXAMPLE 3

Multi Game

The base currency of the jackpot wagering system (1) is USD, the accumulated total of the jackpot is $20 000,00 with a wager requirement of 3×$1 coins to win the jackpot in any of two participating games—Game 1 and Game 2.

Game 1 has a jackpot cycle of 200 000 with a probability of 1 in 200 000 of winning the jackpot, while game 2 has a jackpot cycle of 150 000, or a 1 in 150 000 probability of winning the same jackpot. Both games have the same wager requirements, but different Jackpot cycles (probabilities of winning the jackpot). In this example, a player of game 2 is 200 000/150 000=1.333 times as likely to win the jackpot as a player of game 1.

A $ player wagering 3×$1 coins on game 1 will be playing at a scale of 100% and can win the entire contents of the jackpot upon the occurrence of a favourable event.

The same, or another, $ player wagering 3×$1 coins on game 2 will be playing at the following scale of play:

$$\text{Scale} = \text{Currency}(\%) * \text{Coin size}(\%) * \text{Jackpot Cycle}(\%)$$
$$= 100\% * 100\% * 75\%$$
$$= 75\%$$

In this instance, the player will see a scale parameter of 75% displayed on the display monitor (4) and will win 75% of the jackpot namely $15 000,00, upon the occurrence of a favourable event.

If the contribution percentage for both of these games is 3%, the playees contribution to the jackpot are 3% of the wager in each case, namely 3%*$3.00=$0.09 in respect of each one of the games.

EXAMPLE 4

Partial Jackpots on the Pay Table

The base currency of the jackpot wagering system (1) is USD, the accumulated total of the Jackpot is $20 000,00 with a wager requirement of 3×$1 coins to win the jackpot on a first win line, that is, on the occurrence of a favourable event. The game also enables a player to win 50% of the jackpot on a second win line, that is, on the occurrence of a partially favourable event.

A $ player wagering 3×$1 coins will be playing at a scale of 100% and can win the entire contents of he jackpot upon the occurrence of a favourable event.

The same player, who is playing at a scale of play of 100%, will also be eligible to win 50% of the jackpot, namely $10 000,00 on the occurrence of a partially favourable event on the second win line.

If the contribution percentage for the selected game is 3%, the players contribution to the jackpot is 3% of his wager, namely 3%*$3.00=$0.09.

EXAMPLE 5

Multi Currency, Multiple Coinsize, Multi Game

The base currency of the jackpot wagering system (1) is USD, the accumulated total of the jackpot is $20 000,00 with a wager requirement of 3×$1 coins to win the jackpot in any of two participating games—Game 1 and Game 2.

Game 1 has a jackpot cycle of 200 000 with a probability of 1 in 200 000 of winning the Jackpot, while game 2 has a jackpot cycle of 150 000, or a 1 in 150 000 probability of winning the same jackpot. Both games have the same wager requirements, but different jackpot cycles (probabilities of winning the Jackpot). In this example, a player of game 2 is 200 000/150 000=1.333 times as likely to win the jackpot as a player of game 1.

A $ player wagering 3×$1 coins on game 1 will be playing at a scale of 100% and can win the entire contents of the Jackpot upon the occurrence of a favourable event.

The scale of play for an Australian Dollar (AUD) player wagering 3×0.25 AUD coins on game 2 at an exchange rate of $1=2×AUD will be:

$$\text{Scale} = \text{Currency}(\%) * \text{Coin size}(\%) * \text{Jackpot Cycle}(\%)$$
$$= AUD(\%) * 25\% * 75\%$$
$$= 50\% * 25\% * 75\%$$
$$= 9,375\%$$

In this instance, the player will see a scale parameter of 9.375% displayed on the display monitor (4) and will win 9.375% of the jackpot, namely $1 875,00, which is equivalent to AUD 3750,00, upon the occurrence of a favourable event.

If the contribution percentage for the selected game is 3%, the players contribution to the jackpot is 3% of his wager, namely 3%*AUD 0.75=AUD 0.0225=$0.01125.

When the outcome of the selected game is any one of the three partially favourable outcomes, the portion of the contents of the accumulation account that is won by the player is proportionally reduced. The proportional reduction in response to the occurrence of a partially favourable outcome of the game of chance is inversely proportional to the probability of occurrence of that partially favourable outcome.

It will be still further appreciated by those skilled in the art that the invention provides a jackpot wagering system that exhibits a greater degree of functionality than prior art equivalents. The technical problem solved by this invention is that of creating a jackpot wagering system with an open architecture. Additional participating games can be added to the system with ease, the only relevant parameter of an additional game that needs to be considered being a size of a jackpot cycle of the game. Further, the jackpot wagering system, which enables multiple playing currencies to be used for wagering can be expanded simply to accommodate one or more additional playing currencies. The use of an open communication channel such as the Internet to provide communication between the various component parts of the Jackpot wagering system removes any geographic or organizational limitations that are characteristic of prior art jackpot wagering systems. Still further, the jackpot wagering system, which is suitable for use with online casinos, enables different casinos to participate in the system, each casino being able to link their own menus of games for participation in the common jackpot.

Further technical problems solved by this invention are those of overcoming limitations associated with existing jackpot wagering systems, namely limitations of no choice of game, single-currency wagering, and single coin-size wagering, which restrict the appeal of such jackpot wagering systems to would-be users thereof. The invention overcomes these limitations by providing a practical solution for multi-currency, multi-coin size and multi-game progressive jackpot systems that are accessible to users from jurisdictions with different currencies. Furthermore, the invention enables users to place wagers on different games whilst competing for the same progressive jackpot prize, or a determinable portion thereof. The invention enables users having different levels of risk tolerance to use the invention simultaneously by competing for different determinable portions of the same progressive jackpot prize.

Numerous modifications are possible to this embodiment without departing from the scope of the invention. In particular, the jackpot wagering system may be such that only wagers in integral units of any permissible playing currency are permitted, with use of fractional "coin sizes" being disallowed. Further, the jackpot wagering system can include more than one accumulation account, allowing each game of chance to participate in multiple different jackpots simultaneously. Contributions to, and wins on each jackpot are independent of each other. Still further, the portion of the wager that is accumulated in the accumulation account may be variable instead of being a fixed portion. For example, larger contributions, say 5 percent of the wager, may be accumulated in the accumulation account when the balance of the account is small, decreasing linearly to a minimum of 3 percent as the balance of the accumulation account increases. Yet further, each participating game of chance may have five partially favourable outcomes instead of three.

The invention therefore provides a jackpot wagering system that includes multi-game, multi-currency, multi-coin size and multi-jackpot functionality.

The invention claimed is:
1. A jackpot wagering system, comprising:
a plurality of player terminals, wherein each player terminal is operable by a respective player to select any of a plurality of different games of chance for play and to place a wager on the selected game of chance, each game of chance having a corresponding jackpot cycle and a corresponding maximum wager;
an accumulation facility configured to accumulate in an accumulation account a portion of each wager made on any of the plurality of different games of chance using any of the plurality of player terminals;
a plurality of random event generators corresponding to the plurality of different games of chance, each random event generator being activatable to randomly select an outcome of the corresponding game of chance from a set of possible outcomes that include a favourable outcome, the occurrence of which causes a player who placed a wager on the corresponding game to win a determinable portion of the contents of the accumulation account; and
a determination facility, wherein the determination facility is configured to determine, in response to placement of a player's wager on the player's selected game of chance and prior to activation of the corresponding random event generator, the determinable portion of the contents of the accumulation account as a function of:

a) a size of the player's wager relative to the maximum wager of the player's selected game of chance;
b) a playing currency of the player's wager, wherein the player's wager is denominated in one of a number of different permissible playing currencies; and
c) the jackpot cycle of the player's selected game of chance.

2. A jackpot wagering system as claimed in claim 1 in which the contents of the accumulation account are denominatable in a base currency which is stronger than or equal to a strongest one of the number of different permissible playing currencies.

3. A jackpot wagering system as claimed in claim 2 in which the base currency is a strongest one of the permissible playing currencies.

4. A jackpot wagering system as claimed in claim 3 in which the maximum wager of the player's selected game of chance is denominated in the base currency.

5. A jackpot wagering system as claimed in claim 4 that includes a conversion facility instructable to convert a wager made in any one of the different permissible playing currencies to an equivalent wager in the base currency, the conversion facility including a stored spot exchange rate from each one of the different permissible playing currencies to the base currency, the stored spot exchange rates being updatable from time to time.

6. A jackpot wagering system as claimed in claim 5 in which the player's wager is denominated as an integral number of units or an integral number of fractional units of one of the number of different permissible playing currencies.

7. A jackpot wagering system as claimed in claim 6 in which the determination facility determines the portion of the contents of the accumulation account that can be won by the player upon the occurrence of the favourable outcome as a function of a ratio of the size of the player's wager to the maximum wager of the player's selected game of chance.

8. A jackpot wagering system as claimed in claim 7 in which the determination facility determines the size of the player's wager as a function of a particular permissible playing currency in which the wager is denominated and a corresponding denomination of the units or fractional units of that playing currency.

9. A jackpot wagering system as claimed in claim 8 in which the determination facility determines the portion of the contents of the accumulation account that can be won by the player upon the occurrence of the favourable outcome as a function of the stored spot exchange rate between the permissible playing currency in which the player's wager is denominated and the base currency.

10. A jackpot wagering system as claimed in claim 1 in which the determination facility determines the portion of the contents of the accumulation account that can be won by the player upon the occurrence of a favourable outcome as a function of a product of a ratio of the size of the player's wager to the maximum wager of the player's selected game of chance, and a relative size of the jackpot cycle of the player's selected game of chance.

11. A jackpot wagering system as claimed in claim 10 in which the relative size of the jackpot cycle of the player's selected game of chance is a ratio of the jackpot cycle of the player's selected game of chance to the greatest jackpot cycle of any one of the plurality of different games of chance.

12. A jackpot wagering system as claimed in claim 1 in which the set of possible outcomes of the corresponding game of chance includes a plurality of different partially favourable outcomes, each partially favourable outcome causing the player to win a determinable portion of the contents of the accumulation account that is proportionally reduced.

13. A jackpot wagering system as claimed in claim 12 in which the reduction in response to the occurrence of a partially favourable outcome of the game of chance being played is proportional to the probability of occurrence of the corresponding outcome.

14. A jackpot wagering system as claimed in claim 1 in which the portion of each wager accumulated in the accumulation account by the accumulation facility is a predetermined percentage of the wager.

15. A method for jackpot wagering, comprising the steps of:
using a computer workstation to select a game of chance from among a plurality of different games of chance for play by a player and to place a wager for the player on a turn of the selected game of chance, each game of chance having a corresponding jackpot cycle and a corresponding maximum wager;
accumulating a portion of the player's wager in an accumulation account;
a gaming server, located remotely from the computer workstation, randomly selecting an outcome of the selected game of chance from a set of possible outcomes that include a favourable outcome, the occurrence of which causing the player to win a determinable portion of the contents of the accumulation account; and
determining, prior to randomly selecting the outcome of the selected game of chance, the determinable portion of the contents of the accumulation account as a function of:
a) a size of the player's wager relative to the maximum wager of the player's selected game of chance;
b) a playing currency of the player's wager, wherein the player's wager is denominated in one of a number of different permissible playing currencies; and
c) the jackpot cycle of the player's selected game of chance.

16. A method as claimed in claim 15 in which the contents of the accumulation account are denominated in a base currency which is stronger than or equal to a strongest one of the different permissible playing currencies.

17. A method as claimed in claim 16 in which the base currency is a strongest one of the permissible playing currencies.

18. A method as claimed in claim 17 in which the maximum wager of the player's selected game of chance is denominated in the base currency.

19. A method as claimed in claim 18 in which a wager from any one of the different permissible playing currencies is converted to an equivalent wager in the base currency, a stored spot exchange rate being provided from any one of the permissible playing currencies to the base currency, the stored spot exchange rates being updatable from time to time.

20. A method as claimed in claim 19 in which the player's wager is denominated as an integral number of units or an integral number of fractional units of one of the permissible playing currencies.

21. A method as claimed in claim 20 in which the portion of the contents of the accumulation account that can be won by the player upon the occurrence of the favourable outcome is determined as a function of a ratio of the size of the player's wager to the maximum wager of the player's selected game of chance.

22. A method as claimed in claim 21 in which the size of the player's wager is determined as a function of the playing currency in which the player's wager is denominated and a corresponding denomination of the units or fractional units of that playing currency.

23. A method as claimed in claim 22 in which the portion of the contents of the accumulation account that can be won by the player upon the occurrence of the favourable outcome is determined as a function of the stored spot exchange rate between the playing currency in which the wager is denominated and the base currency.

24. A method as claimed in claim 15 in which the portion of the contents of the accumulation account that can be won by the player upon the occurrence of a favourable outcome is determined as a function of a product of a ratio of the size of the player's wager to the maximum wager of the player's selected game of chance, and a relative size of the jackpot cycle of the player's selected game of chance.

25. A method as claimed in claim 24 in which the relative size of the jackpot cycle of the player's selected game of chance is a ratio of the jackpot cycle of the player's selected game of chance to the greatest jackpot cycle of any one of the number of different games of chance.

26. A method as claimed in claim 15 that includes the step of establishing a plurality of different partially favourable outcomes for the player's selected game of chance, each partially favourable outcome causing the portion of the contents of the accumulation account that can be won by the player to be proportionally reduced.

27. A method as claimed in claim 26 in which the reduction of the contents of the accumulation account that can be won by the player in response to the occurrence of a partially favourable outcome of the game of chance is proportional to the probability of occurrence of the corresponding outcome.

28. A method as claimed in claim 15 in which the portion of the player's wager accumulated in the accumulation account is a predetermined percentage of the wager.

* * * * *